LA VERNE W. NOYES.
CHAIN SHIELD FOR PNEUMATIC TIRES.
APPLICATION FILED OCT. 26, 1905.
961,791.
Patented June 21, 1910.
2 SHEETS—SHEET 1.
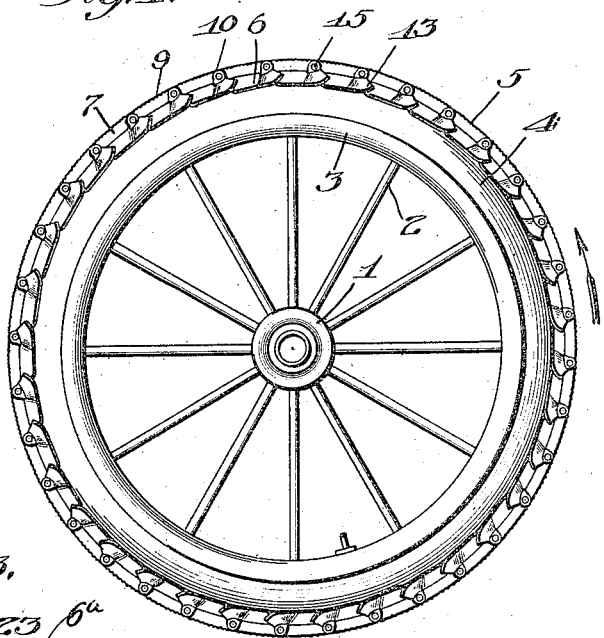
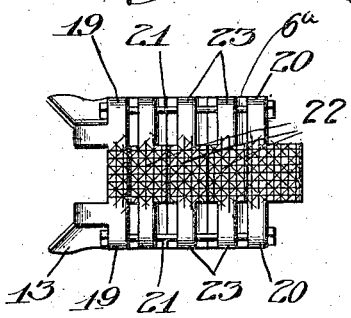
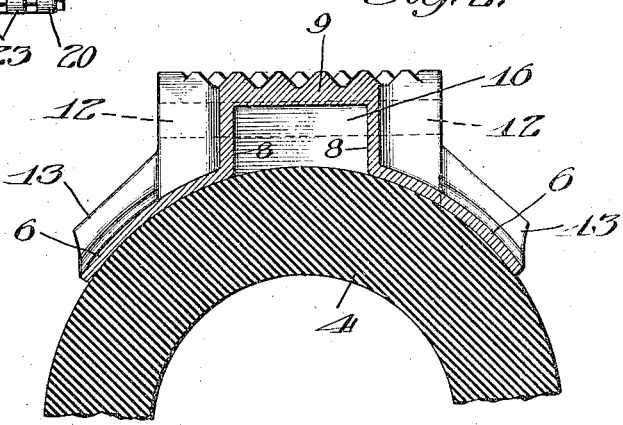
Witnesses:
Robert H. Weir
H. Perry Hahn
Inventor:
LaVerne W. Noyes
By: Jones & Addington
Att'ys:

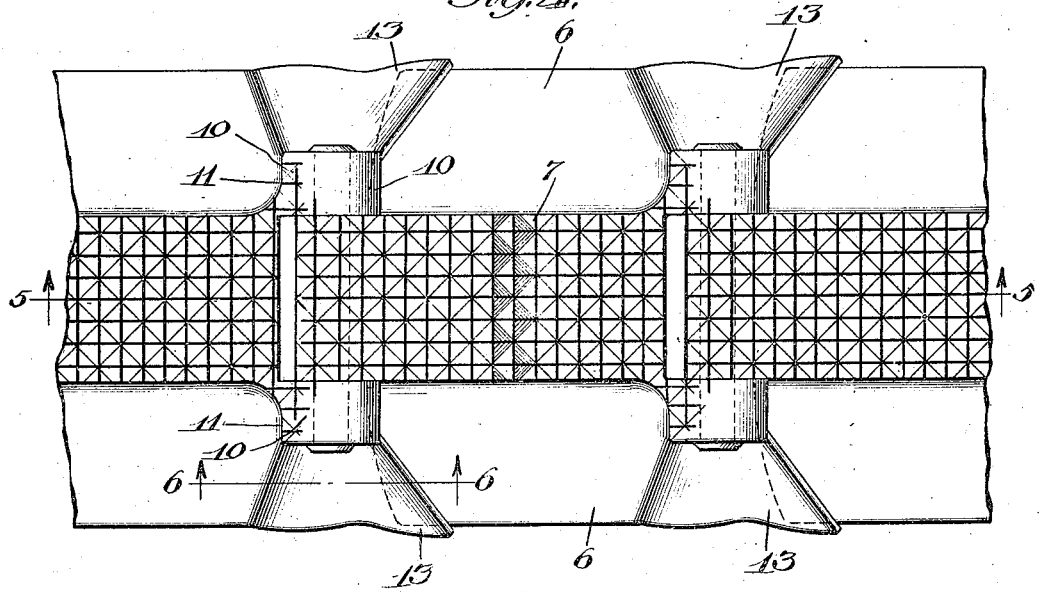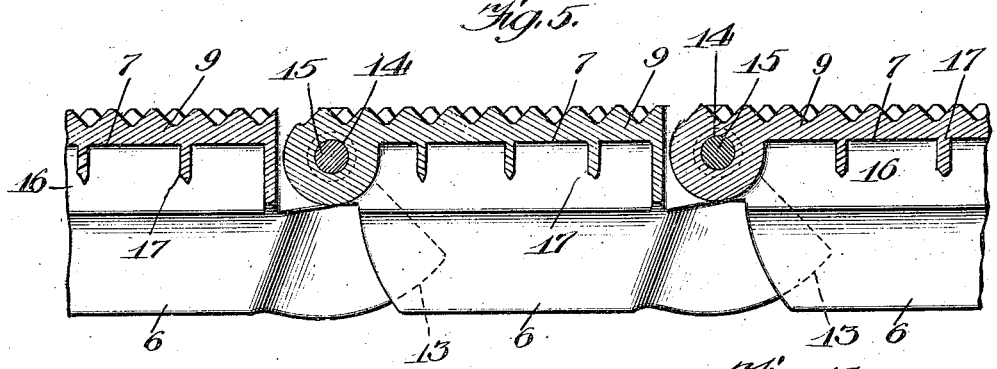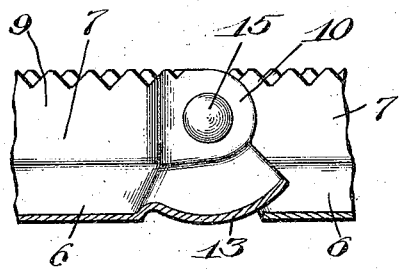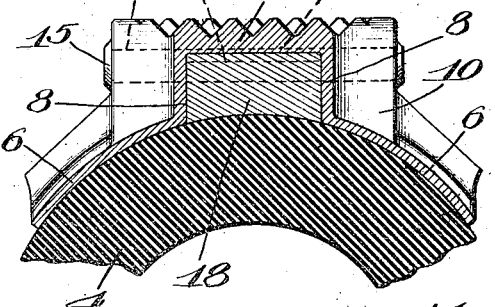

UNITED STATES PATENT OFFICE.

LA VERNE W. NOYES, OF CHICAGO, ILLINOIS.

CHAIN SHIELD FOR PNEUMATIC TIRES.

961,791.  Specification of Letters Patent.  Patented June 21, 1910.

Application filed October 26, 1905. Serial No. 284,515.

*To all whom it may concern:*

Be it known that I, LA VERNE W. NOYES, a citizen of the United States, residing at Chicago, in the county of Cook and State of Illinois, have invented new and useful Improvements in Chain Shields for Pneumatic Tires, of which the following is a full, clear, concise, and exact description, reference being had to the accompanying drawing, forming a part of this specification.

My invention relates to improvements in chains, my object being to provide a chain which shall have one side thereof forming a continuous and unbroken surface, and to provide means whereby the connecting portions of the link will not form projections or obstructions on the surface of the chain.

My chain is especially adapted for use as an armor for pneumatic tires and, when used in this connection, is so constructed that it forms a complete armor for the tire, protecting the same against puncture and also preventing the wheels from skidding.
Another object of my invention is to provide a chain which, when used as an armor for pneumatic tires, is so constructed that the hinges of the links are on the outside of the armor, whereby injury to the tire by the armor is prevented.

I have illustrated the preferred construction and use of my invention in the accompanying drawings, in which:

Figure 1 is a side elevational view of a pneumatic tired wheel with my chain attached as an armor thereto; Fig. 2 is an transverse sectional view of my invention showing the manner in which the same lies upon the tire; Fig. 3 is a plan view of one of the links of a modification of my chain, showing means for connecting the two ends of the chain together to form a continuous and unbroken armor; Fig. 4 is a plan view of a portion of my chain on an enlarged scale; Fig. 5 is a longitudinal sectional view taken on the line 5—5 of Fig. 4 and looking in the direction indicated by the arrows; Fig. 6 is a detail sectional view taken on the line 6—6 of Fig. 4 and looking in the direction indicated by the arrows; and, Fig. 7 is a transverse sectional view of my chain, showing a modification thereof.

In Fig. 1 I have illustrated an automobile or vehicle wheel of the usual construction, comprising the hub 1, the spokes 2, the rim 3 and the pneumatic tire 4. My chain 5 is adapted to surround the tire 4, and to form a complete armor therefor to prevent punctures and to form an additional wearing and traction surface for the tire.

My chain is formed of links, each link comprising flaring arc-shaped flanges 6, from which extends the raised portion 7, having the two side pieces 8 thereof extending vertically from the flanges and a horizontal top portion 9, which is preferably corrugated and forms, when my chain is used as an armor for automobile tires, the tread of the wheel. The rear ends of the flanges 6 have extending vertically therefrom lugs 10, which have the front portions squared as at 11, and are so arranged with respect to the raised portion 7 that they form shoulders on either side thereof. Openings 12 are formed in the lugs 10 through which the hinge pin of the link is arranged to pass. The flanges 6 at their rear ends, at the point 13 where the lugs 10 are formed, are curved outwardly with the openings through the lugs as centers. The forward end of the raised portion 7 extends beyond the flanges 6 and is adapted to fit between the lugs 10 of the next link, being provided with an opening 14 alining with the openings 12 in the lugs 10; a pivot-pin 15 is passed through the openings in the lugs and through the opening in the portion 7, to pivotally connect the links together. When the links are thus connected, the portion 13 of one link is adapted to fit over the forward portion of the next link and by so curving the flange 6 at this point that the pivot of the link forms the center of the curve, the links may move with respect to each other on their hinges a considerable extent without a gap being formed between the flanges of the two links. This arrangement permits of the proper bending of the chain when it is used as an armor for automobile tires without opening the tread, whereby the danger of puncture is obviated and the tire is perfectly protected. By forming the lugs 10 upon the outside of the links and arranging them so that they are provided with the squared shoulders flush with the tread of said links, these shoulders readily enable the wheel to mount car tracks or similar obstructions without strain to the wheel. The underside of the raised portion 7 is preferably hollowed out as at 16, which lightens the chain materially.

If desired, the underside of the flat portion 9 may be formed with downwardly extending spurs or wedges 17 and the hollow part 16 filled with wood, fiber, or other good friction material 18, which is forced into said hollowed part onto the wedges or shoulders 17, whereby the same is securely held in position and prevents the creeping of the armor on the tire which it protects. The raised portion 7 forms a raised tread having substantially square shoulders on either side thereof, which effectually aid in preventing skidding of the wheels in turning corners and, it will be noted, that by my construction I am enabled to provide a raised flat tread which is parallel with the axis of the wheel.

Preferably, my chain is formed into one continuous chain of the size to fit the desired vehicle wheel and in applying the same the pneumatic tire is deflated, which permits the chain to be slipped over the tire and, when the tire is again inflated, the chain armor will be held securely in position.

In Fig. 3 I have illustrated another method of connecting the ends of the chain, whereby the slack of the same will be taken up and the same, when used as an automobile armor, may be always kept tightly fitted around the tire. My preferred construction of this device consists in forming two links which are only about one-third the size of the ordinary link, one of the same being formed substantially as the forward end of the link just described, and having lugs 20, which extend upwardly from the flanges 6ª and outwardly beyond the pivot lugs of the next link. These lugs are preferably formed integrally with the remainder of the link to give added strength. The opposite link is of the same general construction as the rear portion of the regular link, just described, and is provided with lugs 19 similar to the lugs 20. The lugs 19 and 20 are provided with longitudinally extending respectively registering openings, through which the clamping bolts 21 are adapted to pass as shown in the figure referred to. Small blocks 22 formed substantially as the intermediate portion of the link, are also provided with lugs 23 having openings therein to permit the passage of the bolts 21 therethrough, to hold the same in position. As many of these small blocks as may be desired may be inserted between the two short links, and it will be seen that in case the chain becomes slack, by removing one or more of these blocks and screwing up the bolts 21, the chain may be readily tightened around the tire.

While I have described my device in connection with an automobile tire, it will be noted that by reversing the position of the chain, it may be readily used as a conveyer chain.

Having described my invention what I claim as new and desire to secure by Letters Patent is:

1. A chain having the links thereof pivotally connected together and provided with arc-shaped flanges having one end of the same outwardly curved on the pivot of the link as a center.

2. A chain shield formed of links, each link having a raised tread and outer hinges constructed to form shoulders raised substantially to the plane of the tread and arranged on each side of said tread.

3. A chain shield formed of links, each link being formed with arc-shaped flanges arranged to fit over the tire and a tread extending from said flanges and having vertically extending side portions and a top portion arranged parallel with the axis of the wheel, said links being positively pivotally connected together and said flanges being curved outwardly at one end about the respective pivot whereby the links overlap.

4. A chain shield formed of links, comprising each a tread portion, a pair of substantially parallel side portions extending from said tread portion whereby a raised hollow tread is formed, and a pair of arc-shaped flanges extending from said upright portions and arranged to fit over the tire, said links being pivotally connected together.

5. A chain shield formed of links, comprising each a tread portion, a pair of substantially parallel side portions extending from said tread portions whereby a raised hollow tread is formed, and a pair of arc-shaped flanges extending from said upright portions and arranged to fit over the tire, said links being pivotally connected together and said flanges being curved outwardly at one end about the respective pivot whereby the links overlap.

6. A protective shield for tires comprising a plurality of pivotally connected links, each link being formed with a raised tread and arc-shaped flanges extending from said tread having one end thereof curved outward with the pivot of the link as a center.

7. A protective shield for tires formed of a plurality of links pivotally connected together, each link comprising a hollow raised tread having arc-shaped flanges outwardly curved at one end thereof with the pivot of the link as a center.

8. A protective shield for tires formed of a plurality of pivotally connected links, each formed with a hollow raised tread and flanges extending from said tread adapted to conform to the shape of the tire and having one end thereof outwardly curved with the pivot of the link as a center.

9. A chain tire formed of hingedly connected links, the hinges of said links being adapted to form shoulders to enable the wheel to mount car tracks or similar constructions.

10. In a tire armor, a plurality of pivotally connected links, each comprising a raised hollow tread portion and side flanges arranged to fit over the tire, depending wedges inside said tread portion and friction material held in place by said wedges within said tread and engaging the periphery of the tire.

In witness whereof, I have hereunto subscribed my name in the presence of two witnesses.

LA VERNE W. NOYES.

Witnesses:
W. PERRY HAHN,
M. R. ROCHFORD.